United States Patent [19]

Boyer

[11] 4,069,090
[45] Jan. 17, 1978

[54] APPARATUS FOR FORMING AN END CLOSURE IN A TUBULAR KNITTED ARTICLE

[75] Inventor: Jo Clara Boyer, Los Angeles, Calif.

[73] Assignee: Saviano, A.G., Balzers, Liechtenstein

[21] Appl. No.: 665,378

[22] Filed: Mar. 10, 1976

[30] Foreign Application Priority Data

Mar. 14, 1975 Germany .............................. 2511236
Apr. 24, 1975 Germany .............................. 2518298

[51] Int. Cl.² ......................... D04B 9/00; D04B 39/00
[52] U.S. Cl. ....................................... 156/498; 66/26; 156/515
[58] Field of Search .......................... 66/187, 147, 26; 156/251, 498, 515

[56] References Cited

U.S. PATENT DOCUMENTS

| 3,017,314 | 1/1962 | Kebekus et al. ..................... 156/515 |
| 3,234,072 | 2/1966 | Dreeben ............................... 156/515 |
| 3,550,402 | 12/1970 | Colton ................................... 66/147 |
| 4,028,910 | 6/1977 | Wignall et al. ........................... 66/26 |

*Primary Examiner*—Caleb Weston
*Attorney, Agent, or Firm*—Richards, Shefte & Pinckney

[57] ABSTRACT

The end closure apparatus is incorporated in the cylinder of a circular knitting machine in surrounding relation to tubular knit fabric advancing from the knitting needles. The apparatus includes constricting elements that are operable simultaneously to close radially on the surrounded tube to constrict it into a compact substantially solid mass. Each constricting element is formed with an intermediate slit so that the elements constrict the fabric at two zones with a space therebetween for heat severing and sealing operation of an electrical resistance heating tool that moves in the slits through the mass of fabric between the zones and dwells thereat to complete sealing and form a small disc-like heat set closure core connecting the yarns of the fabric into a closed end both on the severed tube portion and on the tube portion remaining depending from the needles of the machine. The fabric at the portion being constricted, severed, and sealed includes synthetic fusible thermoplastic yarn capable of being severed and sealed by the apparatus. Also disclosed is an end closure apparatus having open ring spring-stressed members having end extensions forming inlets for lateral insertion of tubular articles. These members are mounted on a rotatable structure that rotates the members sequentially through a fabric insertion station, and severing and sealing station, and a removal station.

8 Claims, 40 Drawing Figures

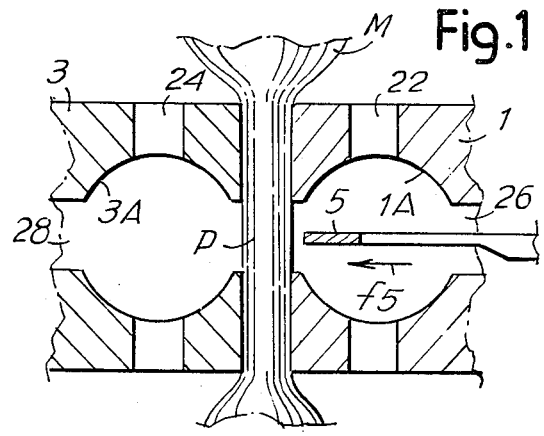
Fig.1
Fig.2
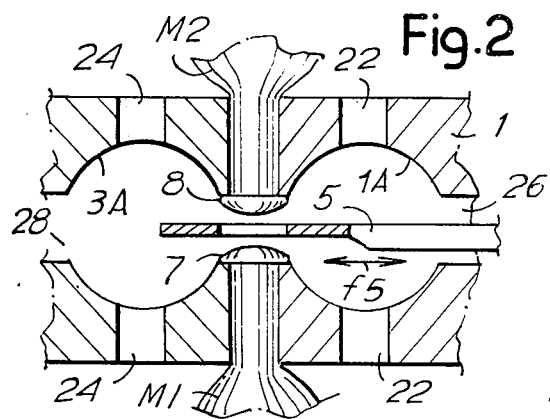
Fig.3
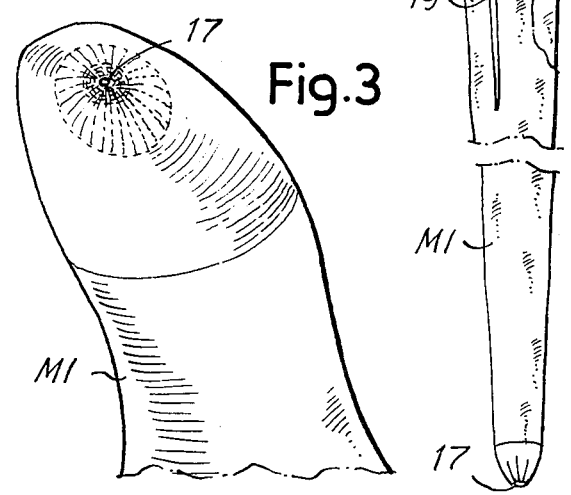
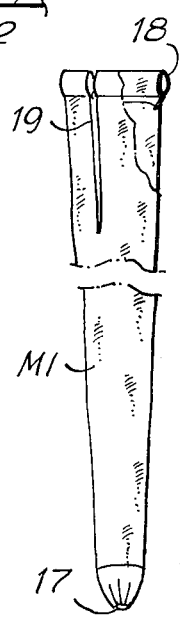
Fig.4
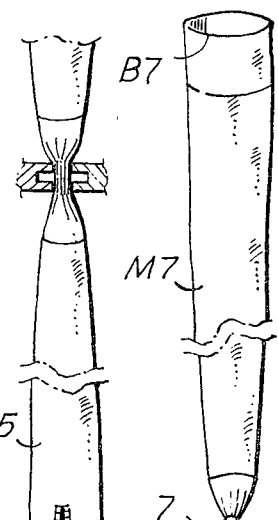
Fig.5
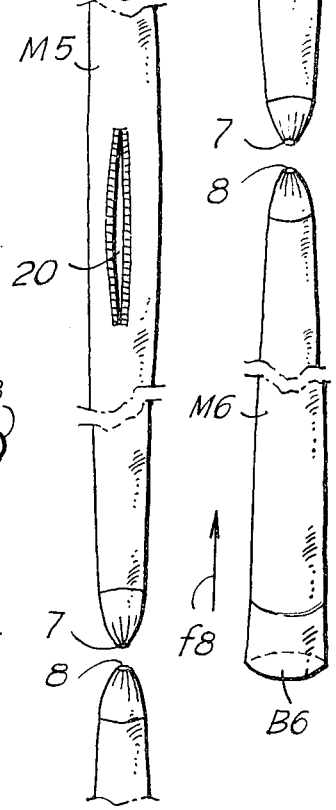
Fig.6

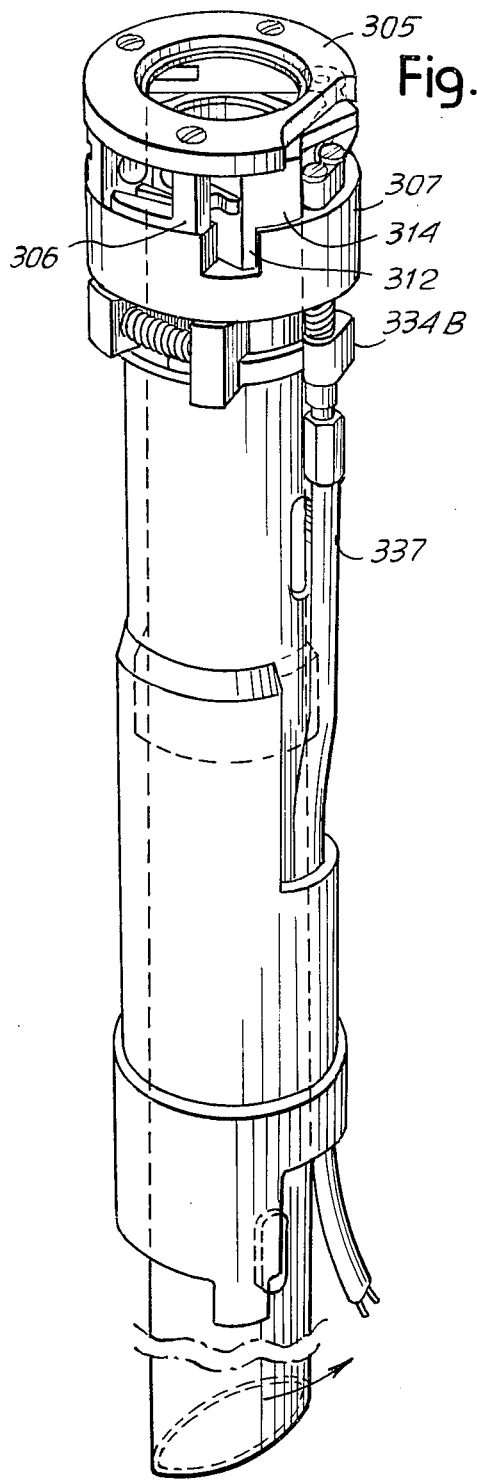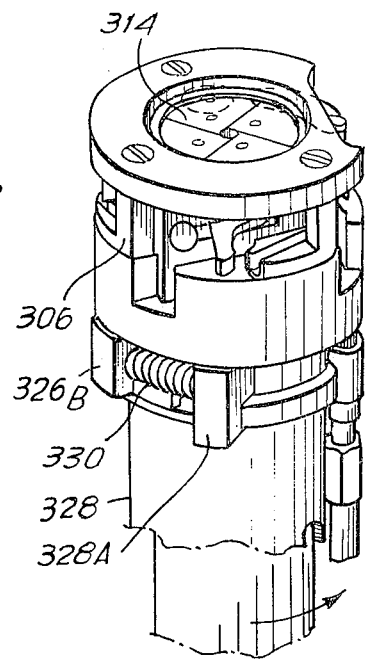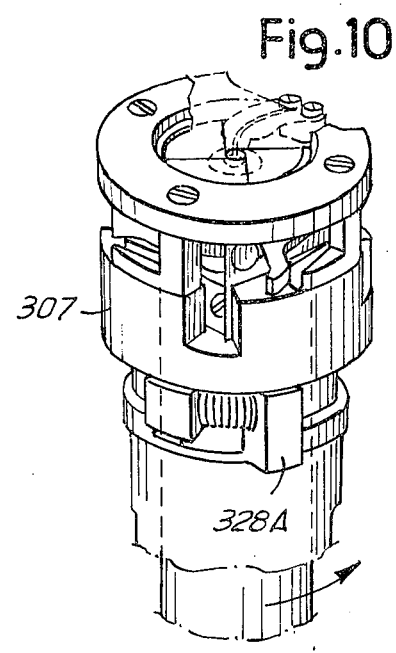

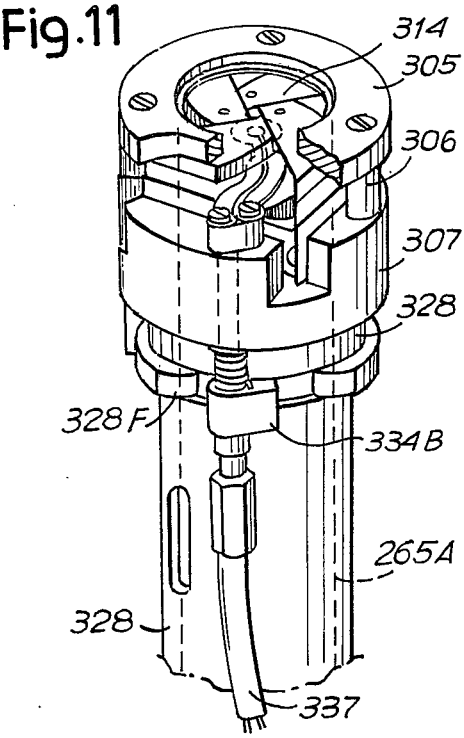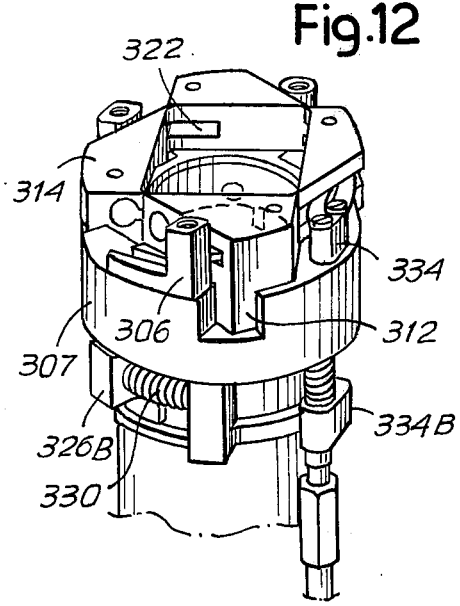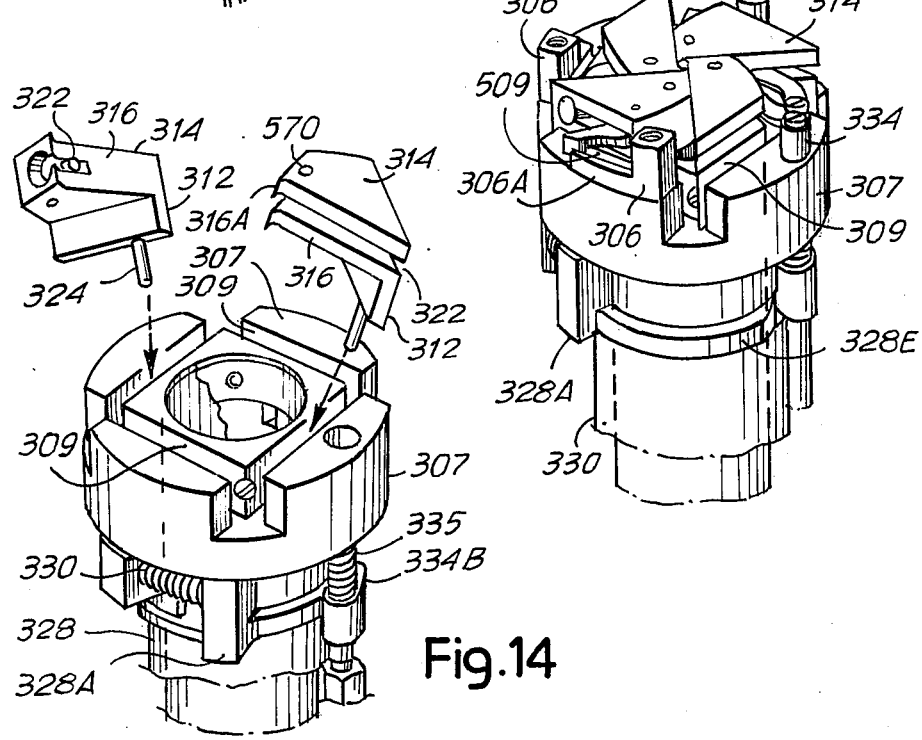

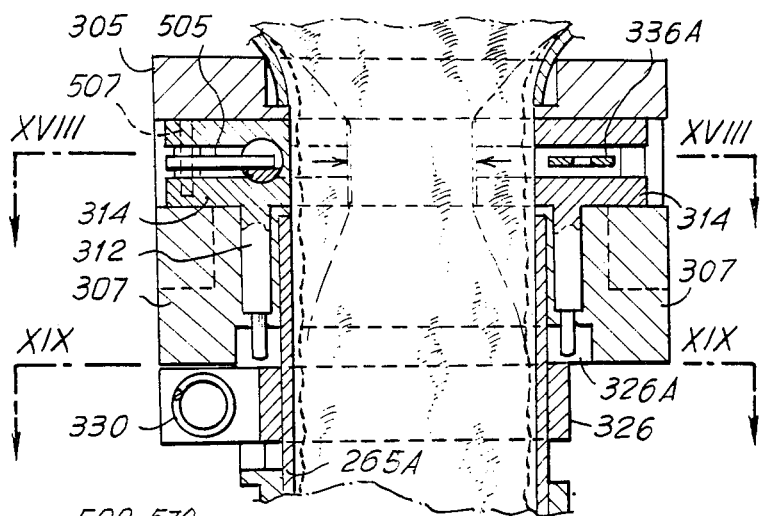
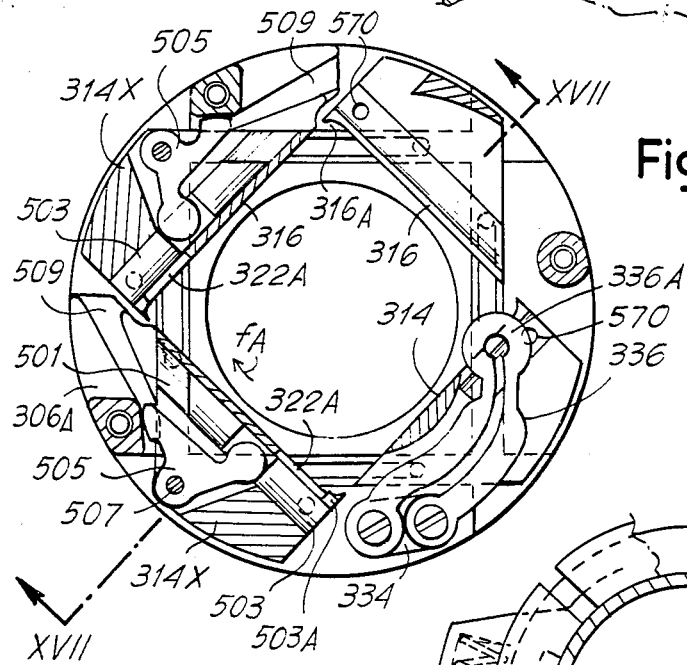
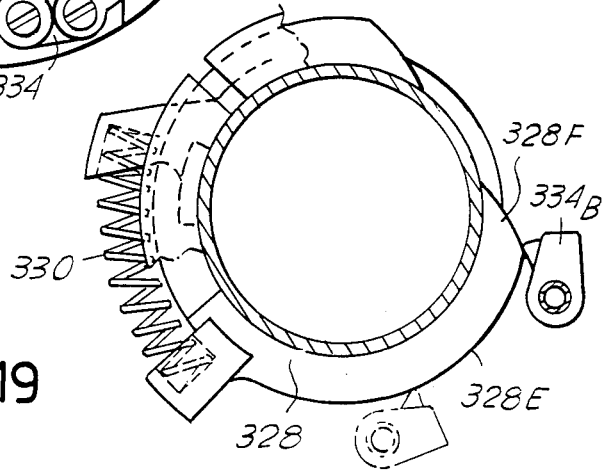

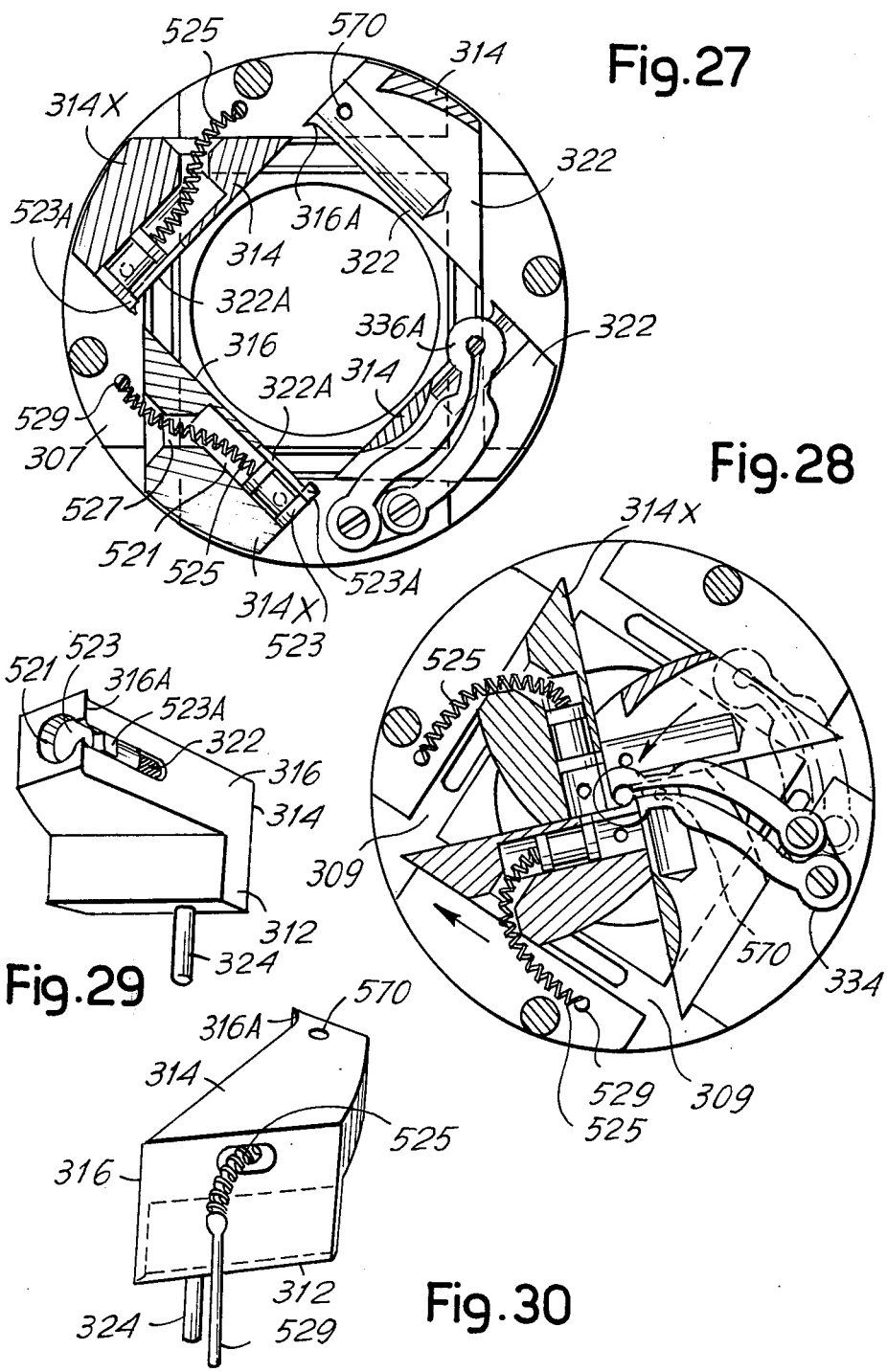

APPARATUS FOR FORMING AN END CLOSURE IN A TUBULAR KNITTED ARTICLE

BACKGROUND OF THE INVENTION

The present invention relates to closing the ends of tubular fabric and more particularly to closing the ends of tubular fabric by constricting the fabric and then severing and sealing the constricted portion of the fabric.

Various attempts have been made to form end closures in tubular fabric with improved production that does not require complex or time consuming operations and mechanisms. Efforts have been directed to this in the knitting field in particular, such as in the production of circular knit hosiery where toe closing of hosiery tubes has traditionally involved difficult and expensive looping operations or separate seaming operations. Obviously it would be advantageous to have an automatic method and apparatus for closing fabric tubes integral with a knitting machine so that tubular articles could be discharged from the machine with ends already closed and without requiring any additional time or operation in regard to end closing.

An example of a prior attempt to close the end of a tubular fabric while it is on a circular knitting machine is disclosed in Currier U.S. Pat. No. 3,340,707, dated Sept. 12, 1967, which teaches twisting of a suspended portion of tubular fabric in relation to the main body of the fabric to constrict by twisting to a small hole size and then knitting the twisted fabric to the body to retain the substantially closed end configuration. This results in a bulky accumulation of fabric due to the twisting and the two thicknesses of fabric required for the closing. As a result this operation has not met with notable commercial acceptance.

Another example of a prior attempt to close the end of a tubular fabric on a knitting machine is disclosed in Colton U.S. Pat. No. 3,550,402, issued Dec. 29, 1970, which shows an operation of questionable operability wherein in one form tubular fabric is restrained at a spacing from knitting needles so that the fabric is twisted and backs up to a centrally located heating element that supposedly fuses the twisted fabric to form a closure, and in another form the heating element is advanced from the side of the restrained fabric. In either form it is not apparent that a reliable and effective toe closure can be obtained for production purposes.

In contrast, the present invention, as more fully explained hereinbelow, provides a simple, efficient, reliable and effective method and apparatus for forming end closures in tubular knitted articles without any variation in the knitting procedure, without any complicating fabric manipulation, or configuration, and results in a strong yet relatively unnoticeable closure core connecting the yarns of the fabric into a closed end.

SUMMARY OF THE INVENTION

Briefly described, the method for forming an end closure in a tubular knitted article according to the present invention includes radially constricting a knitted tube of fabric into a compact substantially solid mass at two zones with a portion of the fabric therebetween. The fabric includes a synthetic fusible thermoplastic yarn in the portion between the zones, and this constricted mass is simultaneously heat severed and sealed to form a small heat set closure core connecting the yarns of the fabric into a closed end. Preferably the severing and sealing forms a small heat set core at the end of each zone and the method is carried out on a circular knitting machine to form a closure core on both the end of the article severed by the operation and on the end of the tube that remains depending from the knitting machine.

The apparatus of the present invention provides means for performing the aforesaid method, including means for radially constricting the tubular fabric into a compact substantially solid mass and means for simultaneously heat severing and sealing. For effective and reliable severing and sealing, the constricting means preferably constricts the fabric at two zones and the severing and sealing means acts to move through the fabric between the zones and dwell thereat to effect complete closure core formation.

In the preferred form of the apparatus of the present invention the constricting means includes four sliders that slide in guides formed in an annular member surrounding the knitted tube being formed, with each slider having an active surface terminating in an arcuate profile formed to slide along the active surface of a contiguous slider in a constricting operation until the arcuate profiles are constricting the fabric into a compact substantially solid mass. The active surfaces and the guides are rectilinear and the arcuate profiles are tangential extensions of the active surfaces for cooperative constricting operation. Further, the active surfaces and arcuate profiles are interrupted by slits that create a space for transverse operation of an electrical resistance tool to accomplish severing and sealing, with passages and enlarged holes provided in the constricting means for air cooling thereof and for operation of a movable cleaning element.

In another form of the apparatus of the present invention the constricting means is in the form of open ring spring-stressed members having end extensions forming inlets for lateral insertion of articles into the members, and the members are mounted on a rotatable structure for sequential movement through a receiving station, a severing and sealing station, and a removing station.

BRIEF DESCRIPTION OF THE DRAWINGS

FIGS. 1 and 2 are enlarged sectional view of the fabric engaging portions of the apparatus of the preferred embodiment of the present invention, showing the elements constricting the fabric prior to severing and sealing in FIG. 1 and showing the elements during and subsequent to severing and sealing in FIG. 2;

FIG. 3 is a perspective view of the toe end of a stocking having a toe closure formed according to the method and apparatus of the present invention.

FIG. 4 is a view of a stocking formed with a closed toe according to the method and apparatus of the present invention;

FIGS. 5 and 6 are views of the progression of article production with toes closed according to the present invention;

FIGS. 8 to 16 are partial perspective views partly exploded of members forming the FIG. 1 device;

FIG. 17 is a cross-section of the device substantially along line XVII-XVII of FIG. 18;

FIGS. 18 and 19 are cross-sections substantially along lines XVIII-XVIII and XIX-XIX of FIG. 17;

FIGS. 27 and 28 are cross-sections similar to those of FIGS. 18 and 21 related to a modified embodiment of the cleaning members used in the apparatus of the present invention;

FIGS. 29 and 30 are perspective views of a slider for constricting the article;

DESCRIPTION OF THE PREFERRED EMBODIMENTS

Figure 7:
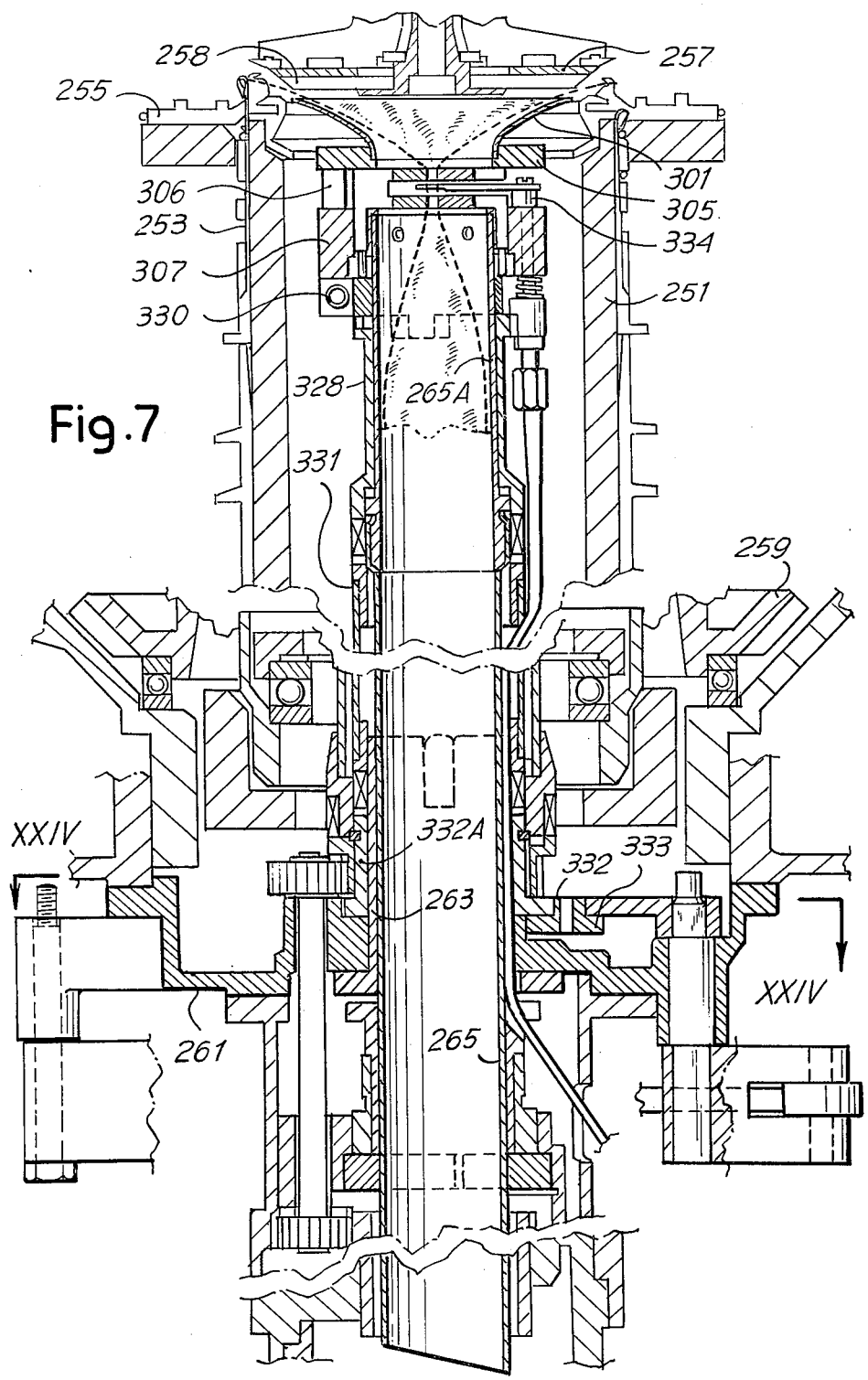
FIG. 7 is an overall vertical section through a device according to the invention, applied on a stocking machine having a rotary needle cylinder.
Figure 15:
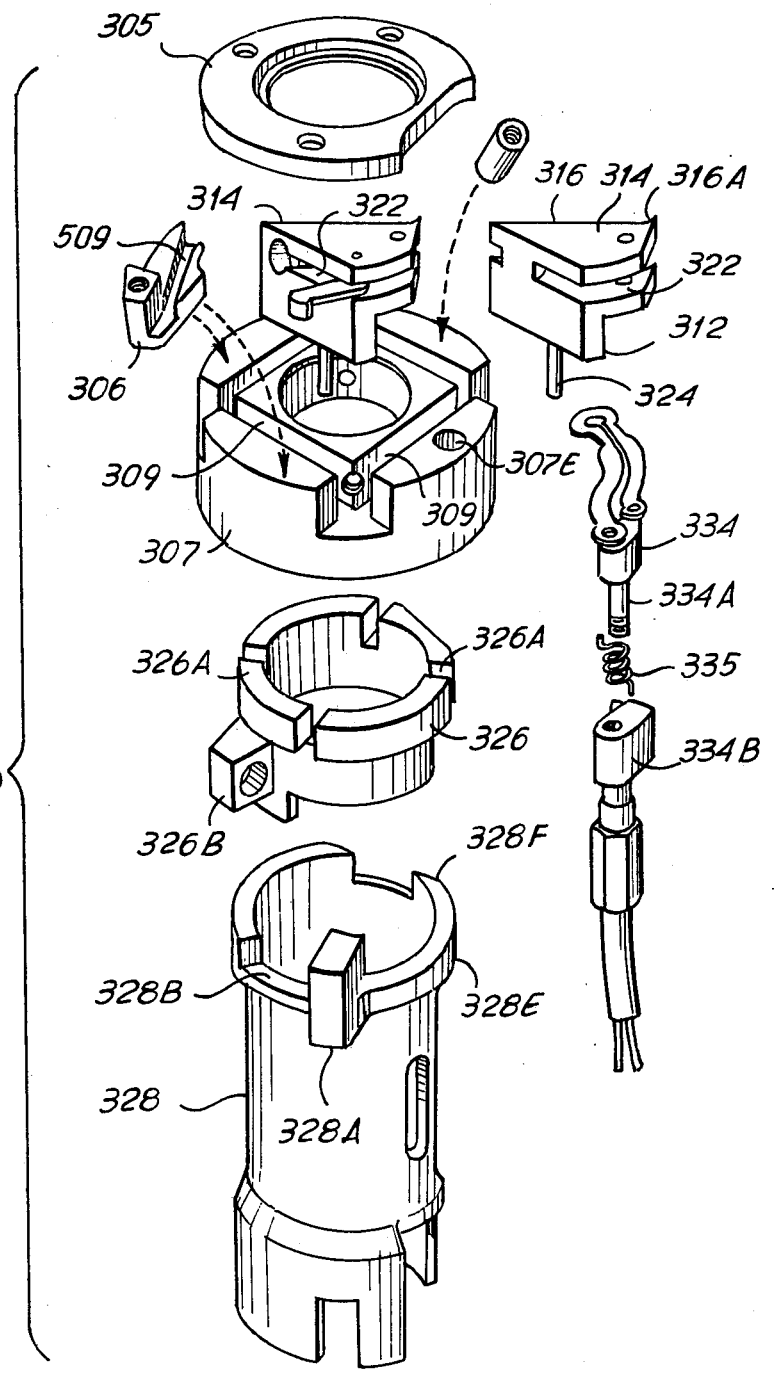
Figure 16:
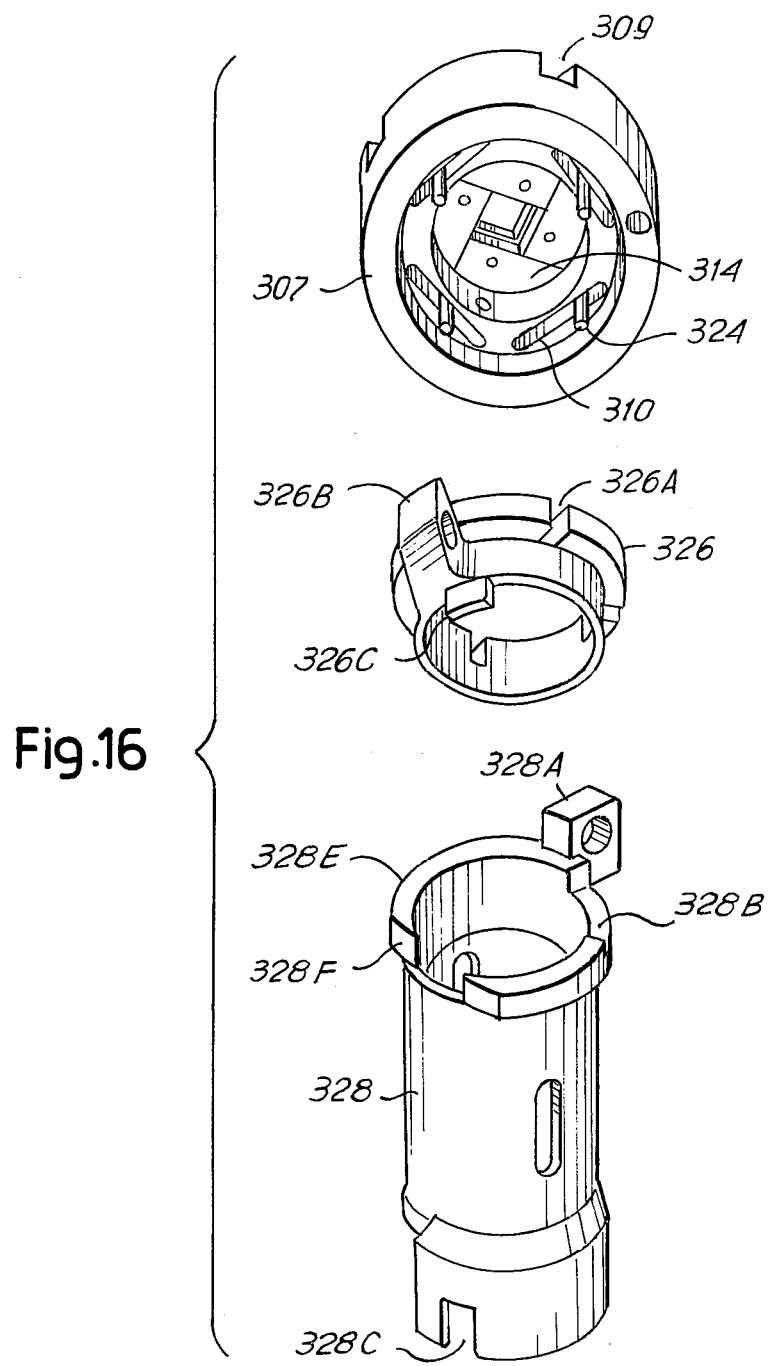
Figure 20:
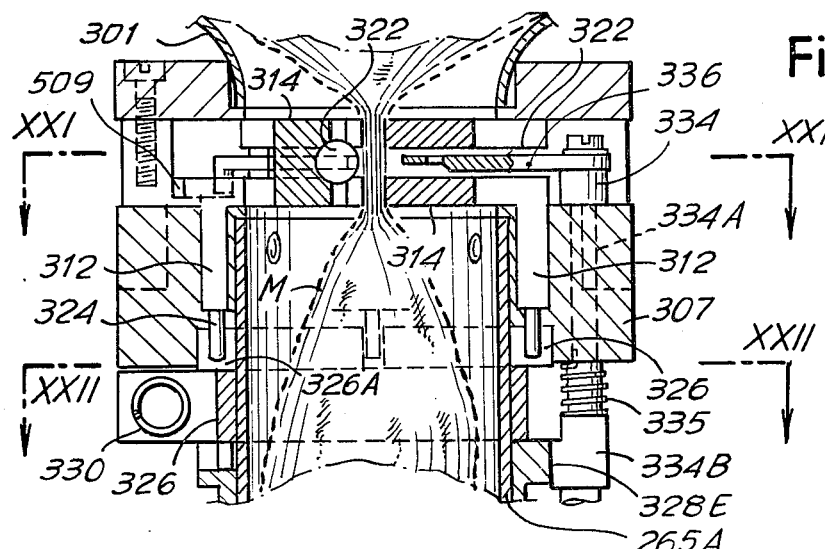
FIG. 20 is a section similar to that of FIG. 17 in a different arrangement of the members illustrated therein.
Figure 21:
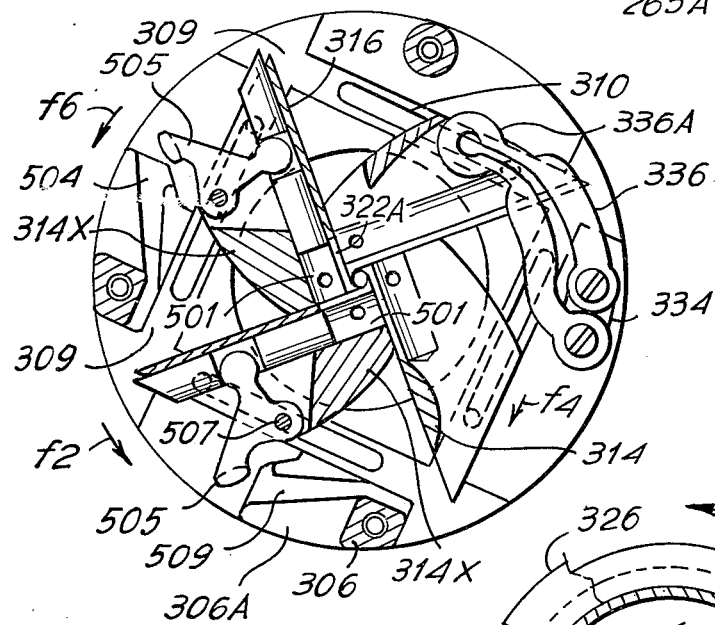
FIGS. 21 and 22 are cross-sections taken along lines XXI-XXI and XXII-XXII of FIG. 20.
Figure 22:
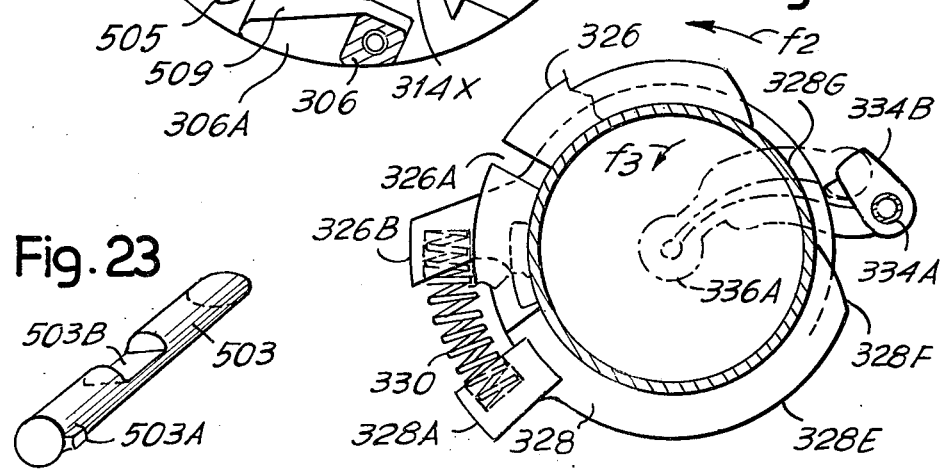
Figure 23:
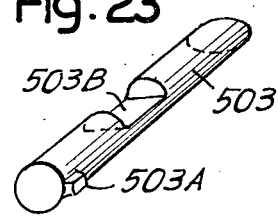
FIG. 23 is a perspective view of a cleaning member used in the present invention.
Figure 24:
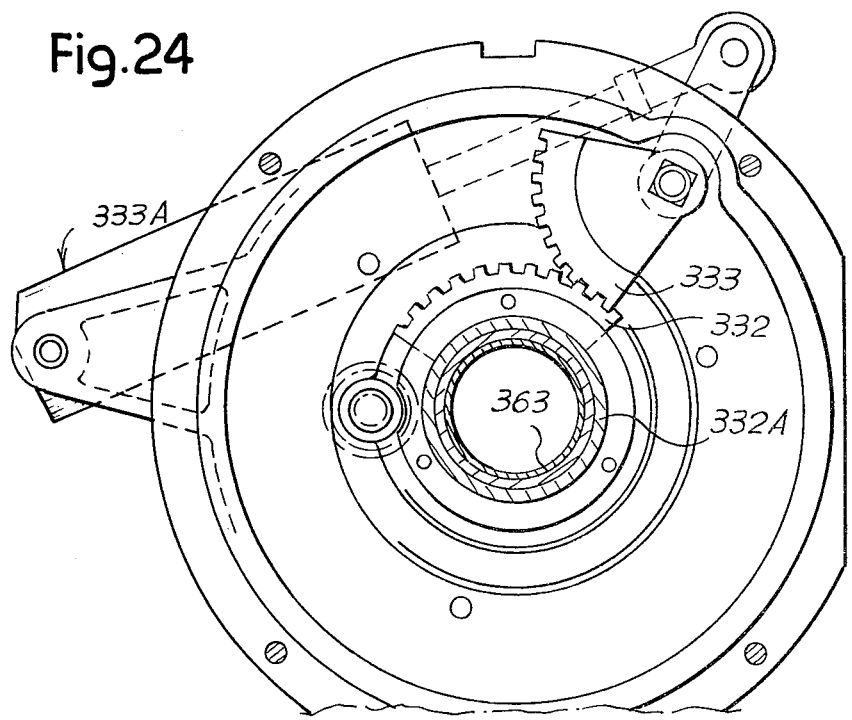
FIGS. 24 and 25 are partial sections taken along line XXIV-XXIV of FIG. 7 in two different arrangements of the therein illustrated members.
Figure 25:
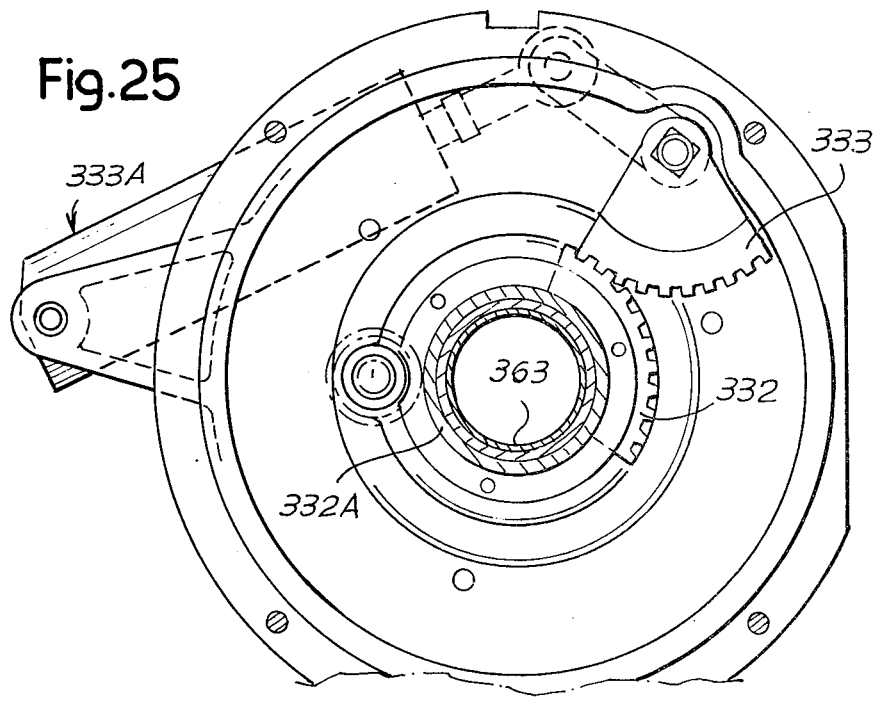

With an initial reference to FIGS. 1 and 2, 1 and 3 roughly denote two members designed to constrict a portion P of a knitted tubular article M tightly into two contiguous zones to obtain two end closed portions of said article, which is thereby separated. The members 1 and 3 may be collet jaws of a tightening device, as will be better described later on, or other separate assemblies, or a one-piece assembly or means having however the ability to radially constrict the fabric in the zone P into a compact substantially solid mass, where the end closure is to be performed.

The assemblies, such as 1 and 3, must constrict fabric so much as to make it very solid in the zone P, with the yarns and fibers in very close contact. At this stage the thus compacted material can be fused. In practice, the thermoplastic yarns, such as nylon, acrylate basis resins, acrylic resins or the like, form at least the major part of the product M to be fused. In this case it is possible to use a severing and sealing means including a heated tool, generically indicated by 5, which is moved according to the arrow f5, in order to obtain the separation of the article M into two portions M1 and M2 and simultaneously the plastification and fusing of the various yarns and/or fibers forming the product until solid small discs 7 and 8 are formed in which all the yarns of the stitches of the respective article portion are anchored. For instance, for a relatively light stocking article provided with yarns in the 20 to 60 denier range, it is possible to obtain a constriction of the product in the zone P to a circular section of approximately 2 to 4 mm. and the disc 7 and 8 may thus reach a corresponding diameter and a thickness, depending upon the degree of plastification, the time the heated tool is acting and other facts, which may be in the range of 0.5 to 1mm.; the disc will not cause discomfort when the stocking is worn, more so if during the subsequent processing the small disc can be placed underneath the toes. The disc reaches a very even shape without any sharp points or ridges that could both damage the lightweight product and hurt the foot. In the case of coarser articles, the disc 7 is formed still small enough so that in any case there are no disturbing effects which could be caused by its existence. For closing the toe in men's socks, it is possible to proceed in such a manner that the normally used yarn (for instance, wool, cotton, etc.) is replaced in the area of the toe by a fine thermoplastic yarn. It has been determined that the knitted fabric which converges into the small disc becomes perfectly anchored and in this way a very durable closed toe is achieved.

The closed toe may also be obtained through fusing, when the fabric is only partly made of thermoplastic yarn.

The heated tool such as 5 moving across may also be used for cutting; in alternative, one may provide for using different and separate means for cutting and for fusing.

According to FIGS. 1 and 2 two ends are simultaneously closed in correspondence of a separating slit or cut between two tubular product portions M1 and M2 obtained by cutting the continuous product; the two assemblies 1 and 2 cause the constricting into two zones immediately above and below the fusing zone, to form the two discs 7 and 8. The portion M1 may represent the closed end of an article, and the portion M2 may form a closed end of another article or waste product.

FIG. 3 shows an article obtained when closing with a fused disc 17, which may be used to form a stocking with an appropriate upper edge 18 (as the so called double welt) or to join it with another article in correspondence of the slit 19, for the purpose of forming a panty-hose. FIG. 4 illustrates the end closed by a fused disc such as 17.

FIG. 5 shows how the invention can be used for forming tubular products M5 which form the two legs and the body or panty of a particular panty-hose type with a longitudinal slit 20 defining the seam line; in this case, pairs of fused discs such as 7 and 8 can be formed to separate the subsequent articles and close their ends at the same time.

FIG. 6 shows a solution in which two products M6 and M7 are made successively, the first with a welt B6 formed on starting the production process on the circular knitting machine (working in the direction of the arrow f8), while the second product M7 is being finished with a welt B7. Both products are separated in the manner previously described by forming two fused small discs 7 and 8. Owing to the structural difference of the two welts B6 and B7 — because the former is made at the beginning of the article and the latter at the end of the article — it is possible to sort out the products in sequence of even and odd numbers, to obtain a uniform production of e.g. stockings, or panty-hose elements as in FIG. 3, which must later be paired.

In order to obtain a good cutting and fused closure result, with suitable heating and cooling, the two assemblies 1 and 3 are shaped to have the constricting surfaces formed by relatively thin zones, this being obtained by two recesses 1A and 3A. These recesses may be aired, for instance by providing holes as 22 and 24, which with the recesses 1A and 3A form air passages for cooling the constricting surfaces through which an air current passes. Slits 26 and 28 in the assemblies 1 and 3 allow the movement of the electrical resistance heated tool 5.

According to what is shown in FIGS. 7 to 30, 251 indicates the needle cylinder, 253 the needles, 255 the sinkers and 257 a dial or disc for the hooks 258; the cylinder 251 is rotated in a manner known per se starting for instance from a bevel gear 259.

The device according to the invention is fixedly supported within the cylinder 251 with the aid of stirrups 261 and a sleeve 263 carrying a duct 265, 265A, in which the article being formed is developed; said product hangs on the needles 253 and advances downwardly. 301 indicates a funnel element which serves to guide the product from the needle working zone 253 of the cylinder 251 to the central zone of the same cylinder and facilitates pneumatic tensioning in said duct 265. 305 indicates a centrally drilled disc-like member located under the funnel member 301. The air stream sucked downwards through the duct 265 is picked up from outside and serves to pneumatically impose the tension on the article being formed. The assembly formed by the funnel element 301 and the member 305 integral therewith is mounted on column bearings 306 fixed to a lower supporting member 307. This member 307 upperly forms four rectilinear channel guides 309 substantially arranged orthogonally as a square; at the bottom of each channel guide 309 there is another corresponding guide 310 made like a through slit and extending partially as compared with the respective channel guide 309. In each guide 309 there is a slider 312 having a block section 314, 314X projecting from the respective channel 309 and forming a rectilinear lateral surface 316 terminating with the end 316A shaped like an arc extending tangentially therefrom; said surface 316 being inclined at 45° with respect to the slider 312 sliding in the guide 309. The bodies 314, 314X are guided between the lower surface of the member 305 and the upper surface of the member 307; this makes the movement of the sliders even. The surface 316 and a part of the block 314 are passed through by a slit 322 or 322A; this slit is shaped differently on the several parts 314, 314X to form a passage for the electric resistance heated tool in an intermediate position of the thickness of the blocks 314, 314X which are combined with the sliders; in FIG. 29 the surface which is free from the slits 322, 322A in the different blocks 314, 314X is shown in section, with the slits 322, 322A defining two constricting zones.

Each of the sliders 312, 314 has a pin 324 extending downwards to engage both the slit 310 (corresponding to the guide groove or channel 309 for the sliders 312) and radial slits 326A of an operating member 326; said operating member is movable around the axis of the unit, in particular around the axis of the duct 265. The operational member 326 is adjacent to a second operating sleeve member 328 also movable around the duct 265, 265A, independently of the member 326 with respect to the member 307, which is fixed and borne by the duct 265, 265A. The member 328 is operated in the hereinafter described manner and has a radial extension 328A which serves to locate thereon an end of a spring 330, whose other end reacts with a shoulder 326B of the member 326; the relative movement between the two members 326 and 328 is limited by a tooth 326C which engages with an arcuate notch 328B in the operating sleeve 328. When operating the member 328, 328A, the latter, through the spring 330, also arcuately entrains the member 326. When said member 326 stops due to any interference, as hereinafter indicated, the member 328, 328A can proceed in its own arcuate operating movement. In the reversed movement, at first only the member 328, 328A is moved, then also the member 326 is moved to return to the starting position. The operation of the member 328 is obtained by a fitting engagement of the tongues of a sleeve extension 331 with seats 328C, said extension being engaged in its turn with the hub 332A of a geared section 332; this sector meshes with a sector 333 operated by a control, for instance a pneumatic control 333A (see FIGS. 24 and 25).

In the member 307 a support 334 is mounted — in an arcuately movable manner according to an axis parallel to that of the unit arriving at the tube 265, which is provided with the pin 334A movably accommodated in a seat 307A of the piece 307. The support 334 carries the electrical resistance heated tool 336 with two extensions from an active end portion 336A formed ringwise thereon. The tool 336, which is connected to a source of electricity by a conductor 337, is located at an intermediate level in the slits 322, 322A in the blocks 314, 314X; the shaping of said slits 322, 322A is such as to allow the movement of the tool 336, 336A around the axis of the member 334, 334A, in such a manner as to allow an arcuate motion of the tool from an outer position to an active position wherein the part 336A is located on the axis of the unit arriving at the tube 265. The support 334 and the axis 334A are in engagement with an extension 334B which forms the tappet designed to lay on a radial cam profile 328E with a ramp 328F of the member 328, said tappet being stressed by a small spring 335, stressing the whole unit 334, 336 around the axis 334A.

When in moving according to the arrow $f2$ the member 328 exceeds a certain stroke extent, the ramp 328F of the profile 328E reaches the extension 334B and allows the spring 335 to move the support 334 and thus the arm of the tool 336, 336A in the direction of the arrow $f3$ around the axis 334A of the same support 334, so that this tool describes the arcuate motion indicated by comparison in FIGS. 27 and 28, to center the end 336A of the tool on the axis of the unit, when the extension 334A lies on the outer profile of the portion 265A of the duct 265. The movement according to the arrow $f3$ only takes place by effect of the spring 335, accordingly the tool is not forced by a rigid control to effect the severing of the constricted fabric. With the movement in the direction opposite to the arrow $f2$, the member 328 with the ramp 328F causes the return stroke of the unit 334, 336, 336A, in a direction reversed to the arrow $f3$. The tool 336, 336A heats, severs and sealingly fuses the fabric in the gap or spice between the two constricting zones defined by the surfaces 316, 316A and the slits 322, 322A which interrupt them at a central zone thereof.

The substantially circular or ring shape of the tool disposed at the solid mass of fabric for symmetrical heating thereof causes the material to fuse under such conditions as to form a core, that is dome shaped disc B, due to lower heating at the center than at the periphery. Moreover, one can obtain a variation of the resistance temperature during the cycle, for instance as indicated hereafter, to obtain collateral effects.

The movement of the tool 336, 336A by connection through the spring 335 allows the tool to penetrate the constricted fabric mass as it is fused, since it is substantially subjected to a constant lateral pressure. This makes the severing even and ensures the integrity of the tool in the event of an unforeseen obstacle in the path of the tool 336, 336A.

Reverting to the sliders 312, 314, and 312, 314X it is to be noted that each of the arcuate ends 316A of the surface 316 of a slider 312, 314 slide on the surface 316 of an adjacent block. When the device is open, as shown in FIGS. 18 and 27, the four sliders 312, 314 and 312, 314X are arranged in such a manner that the arcuate ends 316A are so located as to slide on the end of the surface 316 of a contiguous slider towards the distal end from the end 316A of said slider. Under these conditions, the section of the duct 265 is practically completely free and thereby the article M can extend within the duct 265, 265A and rotate therein, while the same product is formed by the needle cylinder.

When the fabric is to be constricted for severing and sealing one or both ends obtained by severing it, as the zone which is to be closed reaches the level of the slits 322 of the sliders 312, 314 and 312, 314X, the member 328 is operated in the direction of the arrow $f2$. This operation of the member 328 results in a corresponding operation by means of the spring 330 of the member 326. By means of its own radial slits 326A engaging the pins 324, the member 326 acts on said pins and then on the corresponding sliders, forcing the single sliders to run in their respective guides 309 and in their respective slits 310, while the pins 324 are forced to slide in the radial slits 326A, by effect of the relative inclination between these radial slits which are moving and the slider guide slits. This implies that an arcuate movement of the member 326 causes arcuate and centripetal movement of the pins 324 and correspondingly sliding motion of the sliders in the direction of the arrows $f4$ along the guides 309, 310 which are made in the stationary block 307. The sliders in this way move from the open arrangement of FIG. 18 or FIG. 27 to the fabric constricting arrangement in FIG. 21 or 28; it is to be noted that in this movement each of the arcuate ends 316A of the surface 316 slides — in the combined movement between two contiguous sliders — along the surface 316 of the adjacent slider. As the cylinder rotates in the direction of the arrows $f6$, the fabric has no tendency to become entangled in the arcuate ends 316A, while it is constricted by the surfaces 316, which are joined by the tangential extensions formed by the arcuate ends 316A; the article is thus narrowed down to be compressed along the concave arcuate surfaces of the ends 316A, as clearly shown in FIGS. 20 and 21. When the sliders 312, 314 and 312, 314X have reached such a condition as to constrict the fabric M or to touch each other, the article is so constricted as to be practically a solid mass of circular cross-section in the constricting area. At this point, the member 326, which has operated the pins 324, stops in its movement according to the arrow $f2$, while the operating member 328 proceeds in its own angular control stroke, and the spring 330 tends to be compressed, thereby causing a greater constricting of the product; the member 328 in this way is moved with respect to the member 326, as can be noted by comparing FIGS. 21 and 22, while the spring 335, in the presence of the ramp 328F, causes the aforesaid angular movement according to the arrow $f3$ of the unit 334, 336, 336A which thus describes its own angular stroke according to the arrow $f3$. The resistance tool 336A thus movable transversely arrives to engage the constricted knit at the ends 316A of the sliders, causing the simultaneous severing and sealing of the constricted fabric by fusion. The reverse movement of the tool 336A is obtained by effect of reversed control of the member 328, 328A, until 334, 336, 336A returns into the starting position; the return movement (opposite to the arrow $f2$) of the member 328, 328A also leads to a diverging of the sliders 312, 314 and 312, 314X through the slits 326A and the pins 324, imposing in this way a return of said sliders to the starting diverged position. At this point, the article drops away from the unit and the additional fabric depending from the needles and being knit thereby is drawn down by the air-stream in the duct 265 to resume a new working cycle.

The fusing of the fabric is double, that is above and under the tool, thus obtaining two closures for each article at both ends thereof.

During the above indicated movements, the needle cylinder and with it the fabric depending therefrom are stopped. The intake stream in the duct 265 which serves for the tensioning, is discontinued as the sliders are tightened. As soon as the air-stream is resumed around the severing and sealing zone, the fabric thereat and the ends 316A are cooled, thus bringing a stabilizing effect to the severing and sealing, which gives strength to the tubular knit closure. In the instant in which the tool acts, the air-stream is interrupted to avoid the tendency of the tool 336A to cool, and also to prevent the lower fabric from being entrained by the air-stream, being torn away from the collets formed by the surfaces 316 under slits 322 of the still closed sliders, before a sufficient cooling of the plastified fabric is reached.

The resistance tool 336, 336A must reach a temperature sufficient of effective severing and sealing operation. This can be obtained through a manual adjustment of the supply amperage and possibly also through an appropriate sensor that detects the resistance tool temperature and controls it to remain substantially constant during the severing and sealing operation. There may be provided a temperature lowering during the inactive stages of the tool, and the resistance tool may be initially brought up to a relatively low temperature to obtain the severing of the product and the temperature increased subsequently, in the product squeezing zone to complete the sealing fusion.

According to variations of this embodiment, the severing and sealing means may be formed, instead of by electric resistance tool, by a nozzle forming a flame beam, by ultra-sound, microwave means, or the like, which act deeply in the fabric mass.

Figure 26:
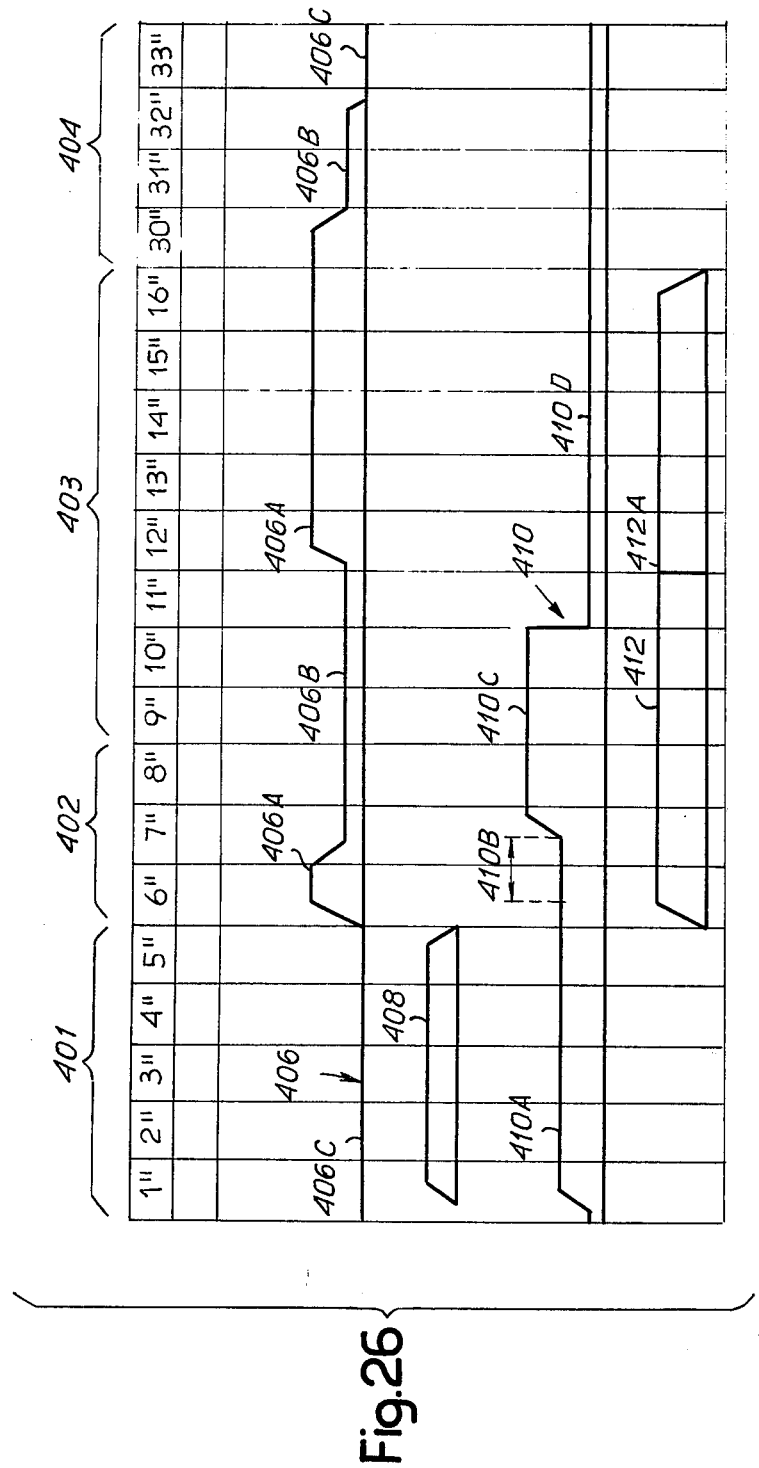
FIG. 26 is a diagrammatic illustration of the phase setting of motions and functions to carry out a closure according to the present invention.

FIG. 26 is a diagrammatic illustration of the operations of the cycle in correspondence of the several functions and movements. In the diagram, on the abscissae there are shown some working stages, in the case of a stocking which is begun from the welt and finished with the closed toe according to the invention. The following working stages are shown: 401 knitting of the toe; 402 withdrawl of the needles to leave the article; 403 beginning and forming of the welt; 404 yielding of the welt by the hooks 258 to the needles 253; the whole being carried out in approximately 33 seconds. The portion 406 indicates the pneumatic tensioning control cam; the portion 406A corresponds to the intake downstream to an article collector; the portion 406B corresponds to the interruption of the intake; and the portion 406C corresponds to the usual intake tensioning. The portion 408 indicates the control period of a micro-switch (operable by a cam on the program drum) for the pre-heating of the resistance for the severing. The portion 410 relates to the supply amperage for the resistance; the portion 410A relates to the heating for the severing; the severing is indicated by the portion 410B; the portion 410C indicates the higher temperature heating for the fusion of the disc at the top of the toe; the portion 410D defines a limited temperature level to keep the resistance tool under partial heating conditions for prompt intervention at each cycle. The portion 410 indicates the collet tightening of the fabric by the sliders 312, 314, the point 412A representing the separation between the severing and sealing stage and the cooling stage of the fabric.

The sliders provided with the slit 322 or 322A, which is differently shaped in each thereof for the passage of the resistance 336, 336A, are subject in certain cases to a more or less quick storing up of residues due to the hot cutting treatment, with the forming also of vapors and fumes of textile fabrics, and it is advisable to avoid the progressive storing up of these residues for reliable and efficient operation of the machines.

For this purpose, according to what is shown in FIGS. 17, 18, 21 and 23, there is provided in some of the sliders, those indicated by 314X, a housing for a slidable cleaning member. These sliders are the distal ones from the path of the resistance tool 336, 336A. The reference numeral 501 indicates said housings which extend in the form of cylindrical cavities which intersect with the limitedly extended slits 322A of the two sliders 314X, in which cleaning means are provided. The two sliders are differentiated by reference numerals 314X from the other sliders 314. In both housings 501, which extend parallel to the surfaces 316 of the sliders 314X, cylindrical slippers 503 provided with projections 503A, which penetrate and slide in the slits 322A, are accommodated. The slippers 503 have transverse seats 503B, in which the circular heads of levers 505 are engaged, said levers being linked at 507 to the sliders 314X and arranged to cooperate with profiles 509 integrally borne by extensions 306A of some of the columns 306. With the motion of the sliders 314X relative to the guides 309, the square levers 505 are moved from the profiles 509 around the linkage 507, imposing in this way motion of the slippers 503 along the housings 501 hence of the extensions 503A along the slits 322A, causing the removal of the residues each time there is a constricting and opening of the collets formed by the sliders 314 and 314X. As practically all of the residue is formed in the slits 322A of the sliders and not in the slits 322 of the other sliders, satisfactory results are obtained. Application of cleaning devices may also be made to the two sliders 314.

In any case, air passages are formed in all the slides for cooling the surfaces 316, including the ventilation holes 570 provided to obtain prompt cooling of the sliders and start of the intake stream in the duct 265 before the sliders diverge and the enlarged holes, 501, formed in all the sliders to obtain a reduction of the thickness of the parts forming the surfaces 316 to minimize heat build up.

In FIGS. 27 to 30 illustrate a variation of the form of the cleaning device for the slits 322A. Also in this case a cylindrical housing 521 is provided in the sliders 314X parallel to the surface 316, with the housing 521 similar to the housing 501 for a cylindrical slipper 523 similar to the slipper 503 and having an extension 523A designed to penetrate the slit 322A. The slipper 523, whose stroke may be limited by stops not visible, is axially stressed by a helical spring 525 which extends in a passage 527 also present in each slider 314X as a deviated extension of the housing 521, to react and lay on a stationary stop 529 borne by the piece 507. With the reciprocal sliding of the sliders in the direction imposed by the guides 309 the springs 525 are tensioned and cause the respective slippers 523 to slide in the housings 521, thereby imposing the sliding of the extensions 523A in the slits 322A and consequently the removal of the fusion and combustion residues from the slits.

Figure 31:
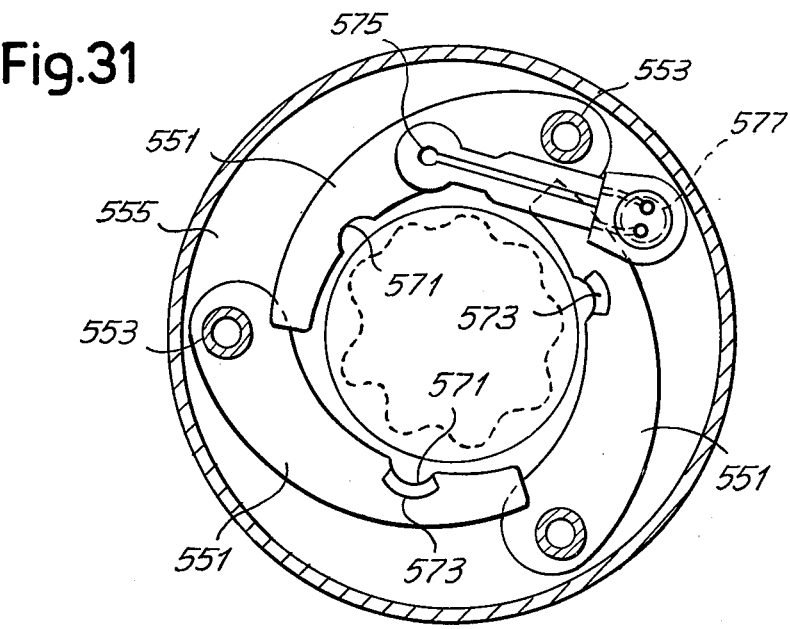
FIGS. 31 and 32 are two cross-section arrangements of a device according to a modified embodiment.
Figure 32:
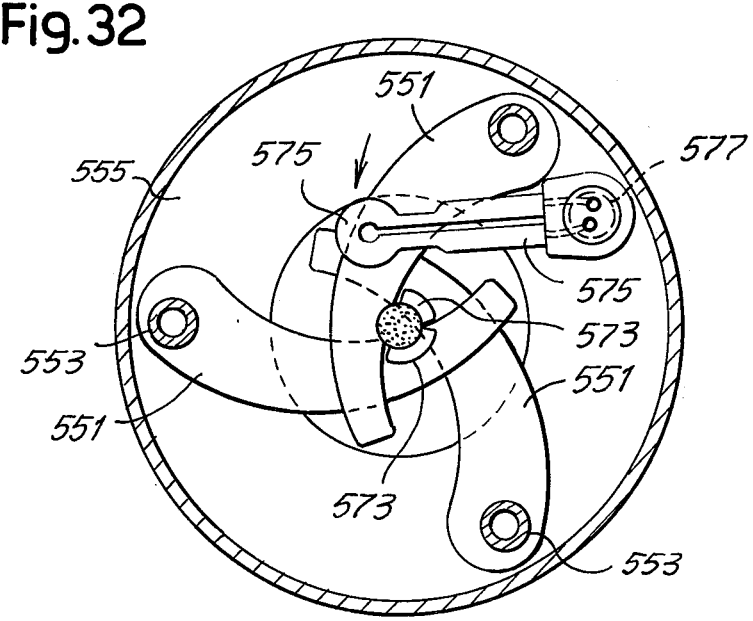

In FIGS. 31 and 32 there is shown a mofidied embodiment for constricting the tubular fabric instead of the sliders 312, 314. According to this embodiment, three pairs of arms 551 are pivoted at 553 to a structure 555 equivalent to 307. The arms 551 are arcuately and simultaneously operated in order to constrict the fabric from the arrangement of FIG. 31 into the arrangement of FIG. 32 wherein the arms define with their recesses 571 a cylindrical constricting area. The arms are located in different planes and the constricting seat is completed by notches 573 in the arms of two pairs. 575 denotes the resistance tool, which is pivoted at 577 and passes between the two arms of one such pair.

Figure 33:
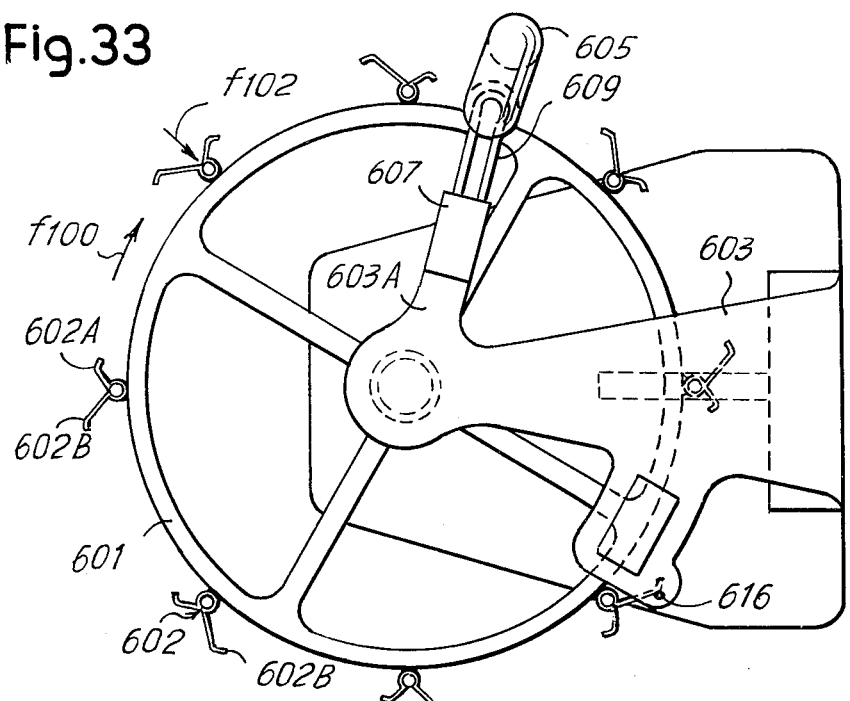
FIGS. 33, 34, 35 illustrate an embodiment of a device with multiple stations for a working subsequent to the production on the circular machine, in a plan view, in a cross-section and in a schematic lateral view respectively.
Figure 34:
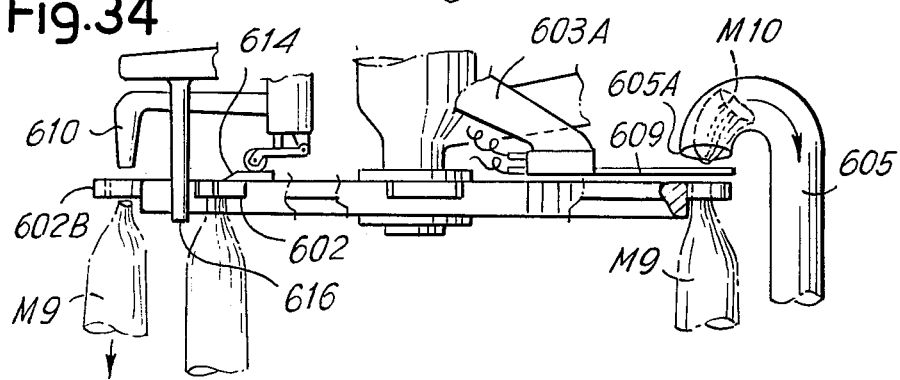
Figure 35:
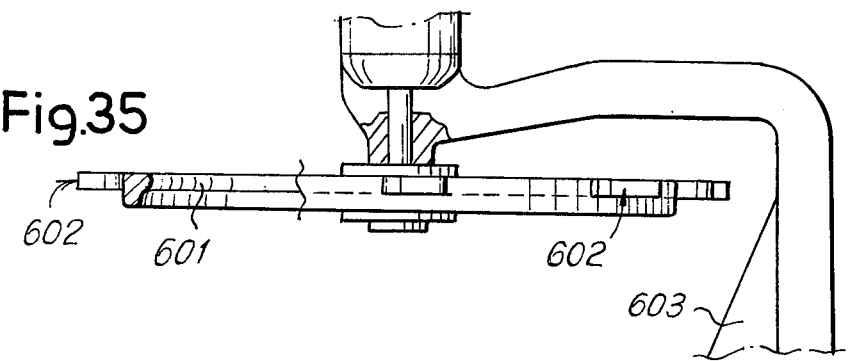
Figure 36:
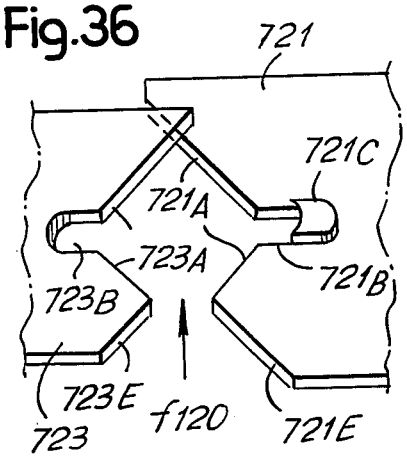
FIGS. 36 and 37 in perspective and FIGS. 38 and 39 in elevation illustrate an additional embodiment in the opening and closing arrangement of the constricting members.
Figure 37:
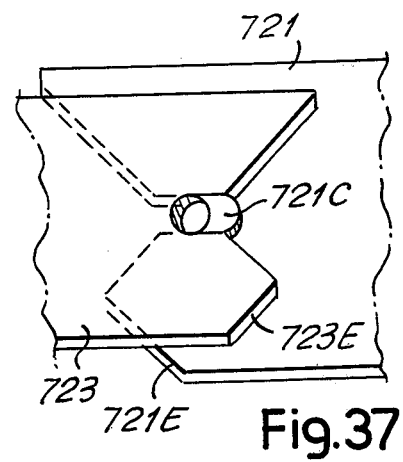
Figure 38:
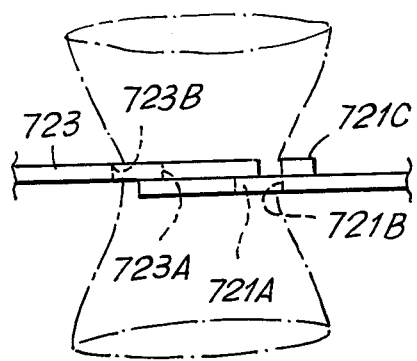
Figure 39:
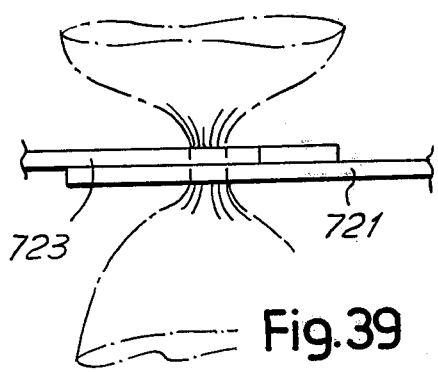

FIGS. 33 and 35 schematically show a small machine for the closing process according to the invention on articles separated from each other and after their production on a circular knitting machine or otherwise. The machine is designed to be used for articles of the type of those in FIG. 3 or in FIGS. 6 or 7. This small machine has a rotatable structure in the form of a rotary table or platform 601 that can advance with a continuous or intermittent motion to make a plurality of fabric constricting means 602 equidistantly spaced around the platform 601, for sequential advancement through several working stations. On a stationary structure 603, which supports the table 601, a duct 605 is mounted and combined with an intake means that has an end 605A forming an intake mouth. On an arm 603A of the structure 603 a support 607 is mounted for a severing and sealing tool 609 in the form of an electrical resistance tool designed to reach the temperatures provided for the purpose. In correspondence of the members 609 and 605A, the severing and sealing take place and then the forming of the disc for the closing of the article end, the residue of the fabric being removed through the intake mouth 605A, which before the removal has ensured the stretching of the end portion M10 of the article M9 during the fusion. In a subsequent position, reached by each constricting means 602 in the motion of the table 601 according to the arrow f100, there is provided a removal unit at which articles are removed from the constricting means. This unit according to the drawing includes a compressed air nozzle 610 controlled by a valve 612 which is open each time that a profile 614 associated with each tightening means 602 passes. In this way, an air jet downwards expels the product supported in one of the means 602.

Each constricting means 602 for the fabric is formed as an open ring spring stressed member provided with two inclined and diverging end extensions 602A and 602B to define an inlet designed to facilitate the insertion of the article in the direction of the arrow f102 that is mostly in a radial direction with respect to the table, providing an intermittent or even continuous motion (and relatively slow) of the table, hence setting the insertion of an article at an insertion station during each dwell of the table. As an alternative, provision can be made to arrange the open ring spring-stressed members with the opening directed forward with respect to the feed direction of the table 601; in this way, it would be sufficient to locate the article in correspondence of the inlet mouth formed by the end extensions 602A, 602B.

The article constricted in the ring 602 of one of the constricting means is advanced to the severing and sealing station at which the tool 609 causes it to be severed and sealed, resulting in the forming of the previously described disc. The article is then withdrawn by traction downwards by the nozzle 610 and/or by belt means at the removal station. In alternative to the unit 610–612, a mechanical ejecting unit may be provided for action in an axial direction from the top to the bottom within the annular constricting means. In another alternative, or in combination, a removal unit 602 may include a pair of endless belts which advance with a peripheral speed approximatively corresponding to that of the table 601, which endless belts extend inclined with respect to the table plane, to cause a downwards return effect of the articles M9 inserted in the peripheral constricting means and peripherally advancing with the table 601. In further alternative, elastic diverging of a ring 602 may be provided by action of one of the inlet extensions, in particular 602B which is backwards with respect to the table advance direction and for this purpose has a greater projection to accommodate the action of a stationary diverging member 616.

FIGS. 36 to 39 show a constricting means different from those previously described. This means may include two essentially symmetrical members 721, 723, developed with facing V-shaped profiles 721A, 723A with a shaped bottom 721B, 723B. One of the members, for instance 721, can have a block 721C to even the constricting edge of its own recess 721B at the level of the recess edge 723B of the member 723 which is located above. The article in this case can be laterally inserted, in the direction for instance of the arrow *f*120 (there being advantageously provided inlet profiles 721E, 723E in the two member 721, 723), thereafter the two members 721, 723 are brought near to each other with a simultaneous motion or with an approaching motion of one thereof with respect to the other which is kept still. The approaching motion can be operated by an elastic means whose action can be counteracted for diverging and presenting the article.

Figure 40:
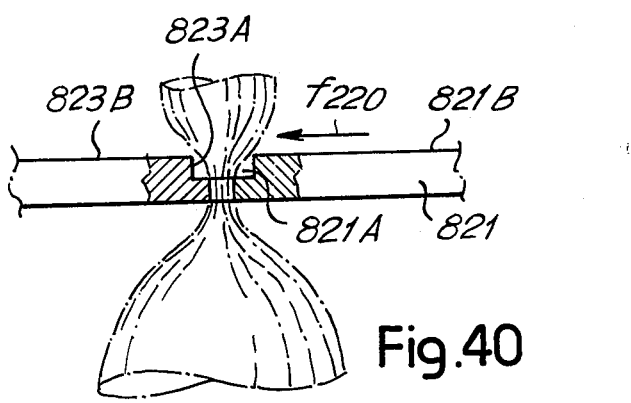
FIG. 40 is a section view of a further embodiment.

FIG. 40 shows a solution in which the jaw units are developed with members 821, 823 which have besides the constricting profiles also steps 821A, 823A, which allow a limited swelling of the constricted fabric between the constricting zone and the upper surface 821B, 823B of the members 821, 823. When severing or after severing the fabric a glue or solvent can be applied to fix the fusion and the formed disc.

The method and apparatus for closing the ends of a fabric article according to the present invention offer particular advantages with respect to the previously known practices, which is particularly apparent to those skilled in the art. In particular, the following advantages are noted:

a. Absence of a reinforced knit, hence shorter production time, lower cost of material, and less thickness in the toe area of the product;
b. Absence of additional stitches, in other words no additional final edge which is bothersome and frequently causes runs;
c. Forming of fabric with all feeds and all needles and hence at a high speed;
d. Possibility of not using dial hooks resulting in fewer needle and hook breakdowns and no need for drive of the dial;
e. No need for annular out-of-phase setting and associated re-setting of the dial with respect to the cylinder, as required by toe twisting operations;
f. Less frequent yarn changes and drum movements;
g. Shorter production time;
h. The possibility of severing a single piece in a single operation to close two adjacent toes without ever letting the stocking fall from the machine, resulting in elimination of the needle latch opening device and in no waste of fabric;
i. The possibility of knitting the foot using a thin yarn in a single thickness and with an even fabric having a single thickness.

Further advantages shall be apparent to one skilled in the art.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. An apparatus for forming an end closure in a tubular knitted article having a synthetic fusible thermoplastic yarn in a portion thereof, comprising means for radially constricting a knitted tube of fabric into a compact substantially solid mass at said portion, said radially constricting means comprising a plurality of sliders sliding in guides formed in an annular member surrounding the knitted tube, each slider having a surface terminating in an arcuate profile shaped to slide along a contiguous slider in the constricting operation until the arcuate profiles engage and constrict the tubular portion into said mass, and means for simultaneously heat severing and sealing said mass to form a small heat set closure core connecting the yarns of the fabric into a closed end.

2. Apparatus for forming an end closure in a tubular knitted article according to claim 1 and characterized further in that said surfaces and guides are rectilinear and the arcuate profiles are tangential extensions of said surfaces.

3. An apparatus for forming an end closure in a tubular knitted article according to claim 1 and characterized further in that there are four guides disposed orthogonally, and there are four sliders sliding in said guides with said surfaces arranged at 45° with respect to said guides.

4. An apparatus for forming an end closure in a tubular knitted article according to claim 1 and characterized further in that said sliders are provided with air passages for cooling of said surfaces.

5. An apparatus for forming an end closure in a tubular knitted article according to claim 1 and characterized further in that said heat severing and sealing means comprises an electrical resistance tool having a substantially circular shape disposed at said mass for symmetrical heating, severing and sealing of said mass to produce a disc-like closure core.

6. An apparatus for forming an end closure in a tubular knitted article according to claim 1 and characterized further in that said surfaces and arcuate profiles are interrupted in a central zone by slits defining two constricting zones with a space therebetween and said severing and sealing means includes a heating tool movable transversely in said space.

7. An apparatus for forming an end closure in a tubular knitted article according to claim 6 and characterized further in that said sliders are provided with air passages for cooling of said surfaces and each said sliders formed with an enlarged hole in said air passage and intersecting said slits for cooling air flow adjacent said severing and sealing means.

8. An apparatus for forming an end closure in a tubular knitted article according to claim 7 and characterized further by a movable cleaning element slidable in said enlarged hole in at least one of said sliders and operable through a drive connection by movement of said slider.

* * * * *

UNITED STATES PATENT OFFICE
CERTIFICATE OF CORRECTION

Patent No. 4,069,090      Dated January 17, 1978

Inventor(s)    Jo Clara Boyer

It is certified that error appears in the above-identified patent and that said Letters Patent are hereby corrected as shown below:

Column 1, line 55, delete "unnocticeable" and insert therefor -- unnoticeable --.

Column 2, line 44, delete "view" and insert therefor -- -- views --.

Column 6, line 52, delete "spice" and insert therefor -- space --.

Column 8, line 2, after "until" insert -- the unit --.

Column 9, line 6, delete "410" and insert therefor -- 412 --.

Signed and Sealed this

Thirtieth Day of May 1978

[SEAL]

Attest:

RUTH C. MASON  
*Attesting Officer*

LUTRELLE F. PARKER  
*Acting Commissioner of Patents and Trademarks*